United States Patent [19]
Beverly

[11] 3,990,409  
[45] Nov. 9, 1976

[54] ROTARY ENGINE

[76] Inventor: Harvey W. Beverly, 3903 E. Zion, Tulsa, Okla. 74115

[22] Filed: Dec. 16, 1975

[21] Appl. No.: 641,255

[52] U.S. Cl. .............................. 123/8.27; 418/196
[51] Int. Cl.² ........................................ F02B 53/00
[58] Field of Search ............... 123/8.27; 8.31, 8.47; 418/196

[56] References Cited

UNITED STATES PATENTS

| | | | |
|---|---|---|---|
| 2,920,814 | 1/1960 | Breelle | 123/8.27 X |
| 2,977,939 | 4/1961 | Fearing | 123/8.27 X |
| 3,297,006 | 1/1967 | Marshall | 123/8.27 X |
| 3,435,808 | 4/1969 | Allender | 123/8.27 X |
| 3,780,710 | 12/1973 | Przybylski | 123/8.47 |

FOREIGN PATENTS OR APPLICATIONS

| | | | |
|---|---|---|---|
| 106,385 | 5/1927 | Austria | 123/8.27 |
| 583,035 | 10/1924 | France | 123/8.47 |
| 1,372,782 | 8/1964 | France | 123/8.27 |

Primary Examiner—Carlton R. Croyle  
Assistant Examiner—Michael Koczo, Jr.  
Attorney, Agent, or Firm—Harris, Kern, Wallen & Tinsley

[57] ABSTRACT

A rotary engine of the internal combustion type comprising a housing having therein a main rotor chamber providing a main rotor axis and having therein combustion and exhaust blocking rotor chambers which intersect the main rotor chamber and which provide combustion rotor and exhaust blocking rotor axes spaced from and parallel to the main rotor axis. A lobed main rotor is rotatable in the main rotor chamber, and combustion and exhaust blocking rotors are rotatable in the combustion and exhaust blocking rotor chambers. The combustion rotor is provided with circumferentially spaced combustion cavities therein to receive the lobes, and the exhaust blocking rotor is provided with circumferentially spaced cavities to receive the lobes. The main, combustion and exhaust blocking rotors are geared together and the peripheries of the combustion and exhaust blocking rotors are substantially tangent to the periphery of the main rotor between the lobes thereon. The main rotor chamber is radially enlarged ahead of the combustion rotor to provide an accumulator zone which maintains the fuel-air mixture at a desired pre-compression. There is a gap between the trailing edge of each combustion cavity and that one of the lobes which is disposed therein to insure free flow of the fuel-air mixture between the accumulator zone and such combustion cavity. The main rotor carries spark plugs having spark gaps on the trailing sides of the lobes in the direction of main rotor rotation, each spark plug being actuated when the lobe carrying it is disposed in one of the combustion cavities and when the trailing edge of such combustion cavity is substantially tangent to the main rotor. Circular end plates on the ends of the combustion and exhaust blocking rotors minimize leakage at the ends of such rotors, and also improve their physical strengths.

6 Claims, 4 Drawing Figures

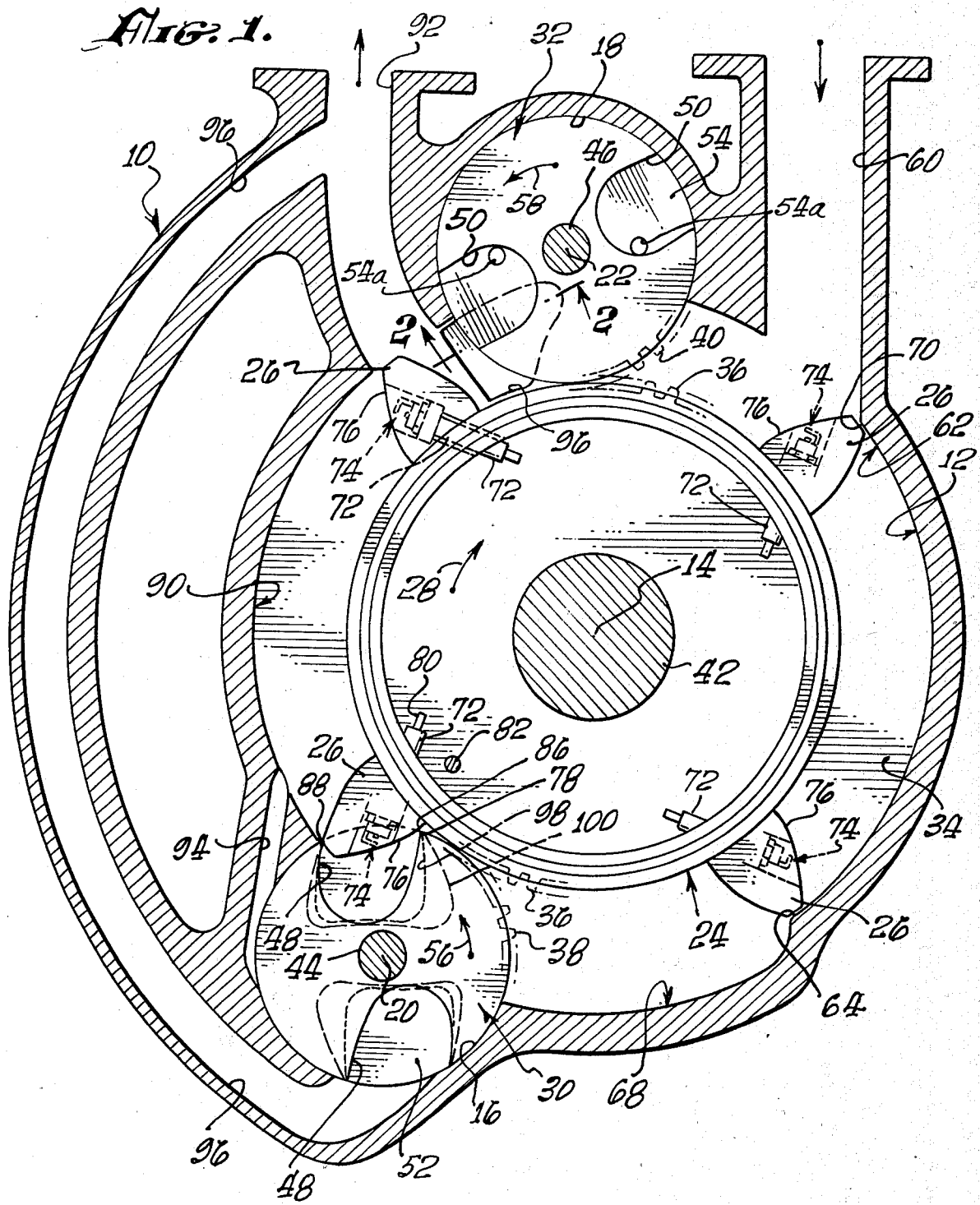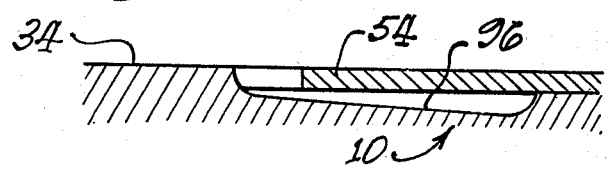

ROTARY ENGINE

BACKGROUND OF INVENTION

The present invention relates in general to a rotary engine of the internal combustion type and, more particularly, to a rotary engine which includes: a housing having therein a main rotor chamber providing a main rotor axis: a main rotor rotatable in the main rotor chamber about the main rotor axis in a predetermined direction of rotation; the main rotor being provided on its periphery with circumferentially spaced lobes; the housing having an intake communicating with the main rotor chamber; the main rotor chamber having a radius substantially equal to, but slightly exceeding, the outer radius of the lobes in a first zone bridging the intake and extending downstream therefrom in the direction of main rotor rotation; the main rotor chamber having a second zone extending downstream from the first zone in the direction of main rotor rotation; a combustion rotor chamber located downstream from the second zone in the direction of main rotor rotation and intersecting the main rotor chamber and providing a combustion rotor axis spaced from and parallel to the main rotor axis; a combustion rotor rotatable in the combustion rotor chamber and having circumferentially spaced combustion cavities therein to receive the lobes on the main rotor; the main rotor chamber having a radius substantially equal to, but slightly exceeding, the outer radius of the lobes in a third zone extending downstream from the combustion rotor in the direction of main rotor rotation; the housing having an exhaust communicating with the main rotor chamber in the third zone adjacent the downstream end of the third zone in the direction of main rotor rotation; an exhaust blocking rotor chamber located between the third and first zones and intersecting the main rotor chamber and providing an exhaust blocking rotor axis spaced from and parallel to the main rotor axis; an exhaust blocking rotor rotatable in the exhaust blocking rotor chamber and having circumferentially spaced cavities to receive the lobes on the main rotor; gear means interconnecting the main rotor, the combustion rotor and the exhaust blocking rotor; the peripheries of the combustion rotor and the exhaust blocking rotor being substantially tangent to the periphery of the main rotor between the lobes thereon; and means for producing a spark in each combustion cavity in the combustion rotor when the trailing edge of such combustion cavity is substantially tangent to the main rotor.

OBJECTS AND SUMMARY OF INVENTION

The primary object of the invention is to provide a rotary engine of the foregoing construction wherein the second zone mentioned is a radially and/or laterally enlarged accumulator zone in which a desired degree of pre-compression of the fuel-air mixture is maintained just ahead of the combustion rotor and which supplies a pre-compressed mixture to each combustion cavity in the combustion rotor. With this construction, tight seals between the main rotor and the housing are unnecessary so that tolerances can be relaxed. Also, no lubricant between the main rotor and the housing is necessary, which reduces air pollution. Additionally the effect of heat distortion is minimized.

Another important object of the invention is to provide a construction wherein there is a relatively large gap between the trailing edge of each combustion cavity and that one of the main rotor lobes which is disposed therein. With this construction, the pre-compressed fuel-air mixture in the accumulator zone can flow therefrom into successive combustion cavities, thereby eliminating any necessity for tight seals between the combustion cavities and the lobes to maintain compression in the combustion cavities.

Another important object is to provide a rotary engine construction wherein the main rotor carries spark plugs having spark gaps on the trailing sides of the main rotor lobes in the direction of main rotor rotation, each spark plug being actuated when the lobe carrying it is disposed in one of the combustion cavities and when the trailing edge of such combustion cavity is substantially tangent to the main rotor. With this construction, the flame front has a very short distance to travel to traverse the entire combustion cavity and, by starting the flame front on the moving lobe, it does not have to follow a retreating lobe, thereby producing quicker and cleaner combustion.

Yet another object of the invention is to provide circular end plates respectively carried by the ends of and having substantially the same diameters as the combustion and exhaust blocking rotors, thereby minimizing leakage around the ends of such rotors and increasing their physical strengths.

A further object is to provide passage means in the housing for connecting each of the combustion cavities to the third zone after a lobe on the main rotor leaves such combustion cavity and passes the other edge of this passage means to keep the pressure from escaping out the exhaust. This passage means thus provides a longer and stronger power surge.

An additional object is to provide in the housing a scavenging passage means which scavenges to the exhaust of the engine most of any residual products of combustion in each combustion cavity.

Other objects of the invention are: lubricant is necessary only at the gear drive and shaft bearings; the lobes do not touch the rotor chamber walls and exhaust pressure in the power zone is used to keep the compression from leaking, so that there is a pressure seal on both sides of the combustion rotor; general relaxation of tolerances at key points in the engine is achieved; and the burning cycle of the engine should maintain a lower peak heat of combustion with lower peak pressures, which will help in the prevention of NOx and CO.

The foregoing objects, advantages, features and results of the present invention, together with various other objects, advantages, features and results thereof which will be evident to those skilled in the rotary engine art in the light of this disclosure, may be achieved with the exemplary embodiments of the invention illustrated in the accompanying drawings and described in detail hereinafter.

DESCRIPTION OF DRAWINGS

FIG. 1 is a semidiagrammatic, transverse sectional view of a rotary engine which embodies the invention;

FIG. 2 is a fragmentary sectional view taken as indicated by the arrowed line 2—2 of FIG. 1.

DETAILED DESCRIPTION OF EXEMPLARY EMBODIMENTS OF INVENTION

Figure 3:
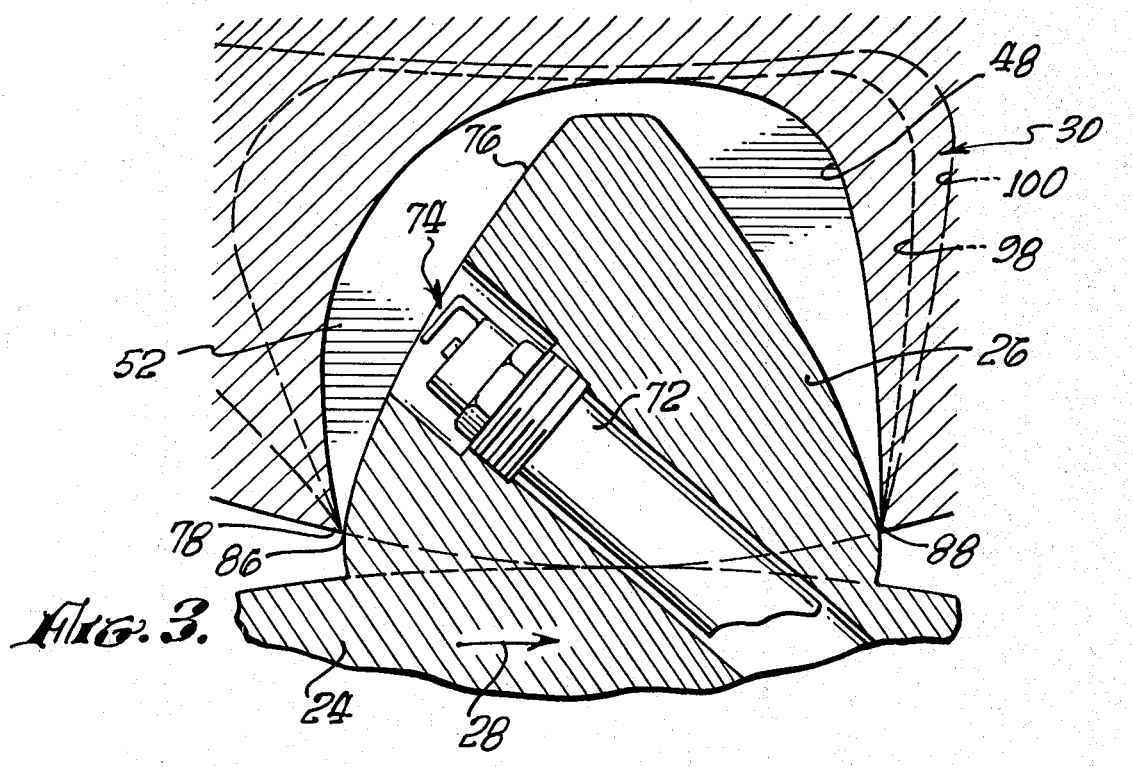
FIGS. 3 and 4 are enlarged, fragmentary, transverse sectional views showing alternate main rotor lobe configurations, alternate combustion cavity configurations, and alternate spark plug locations.

Referring initially to FIG. 1 of the drawings, the rotary engine of the invention is illustrated therein semidiagrammatically in transverse cross section and includes a housing 10 provided therein with a main rotor chambe 12 having a main rotor axis 14. Intersecting the main rotor chamber 12 are combustion and exhaust blocking rotor chambers 16 and 18 respectively providing combustion and exhaust blocking rotor chamber axes 20 and 22 spaced from and parallel to the main rotor axis 14.

Rotatable in the main rotor chamber 12 about the main rotor axis 14 is a main rotor 24 provided on its periphery with circumferentially spaced lobes 26, the main rotor 24 rotating in the direction of the arrow 28. Rotatable in the respective combustion rotor and exhaust blocking rotor chambers 16 and 18 are combustion and exhaust blocking rotors 30 and 32 the peripheries of which are substantially tangent to the periphery of the main rotor 24 intermediate the lobes 26 thereon.

The rotors 24, 30 and 32 extend longitudutinally between common end walls of the chambers 12, 16 and 18, one such end wall being visible in FIG. 1 and being designated by the numeral 34. Gear means interconnects the main rotor 24 and the combustion and exhaust blocking rotors 30 and 32, such gear means including a main rotor gear 36 connected to the main rotor 24 and meshed with combustion and exhaust blocking rotor gears 38 and 40 respectively connected to the combustion and exhaust blocking rotors 30 and 32. It will be understood that the gears 36, 38 and 40 may be located behind the common rotor chamber end wall 34 shown and are respectively connected to the shafts 42, 44 and 46 of the rotors 24, 30 and 32. The gear configurations are such as to provide the proper timing.

The combustion rotor 30 is provided therein with circumferentially spaced combustion cavities 48 to receive the lobes 26 on the main rotor 24. Similarly, the exhaust blocking rotor 32 is provided with circumferentially spaced cavities 50 therein to receive the lobes 26 on the main rotor 24. The combustion and exhaust blocking rotors 30 and 32 are respectively provided on the ends thereof with circular end plates 52 and 54 of the same diameters as the combustion and exhaust blocking rotors and recessed into the end walls 34, such end plates minimizing leakage around the ends of and physically strengthening the combustion and exhaust blocking rotors, which is an important feature. Only one end plate 52 and one end plate 54 are visible in FIG. 1 of the drawings. The combustion and exhaust blocking rotors 30 and 32 respectively rotate in the directions indicated by the arrows 56 and 58. Holes 54a in the end plates 54 provide communication between the cavities 50 and exhaust scavenging passages 96 to be described.

The housing 10 is provided therein with a fuel-air mixture intake 60 which communicates with the main rotor chamber 12 in a first zone thereof extending from the exhaust blocking rotor chamber 18 to a point 64 on the peripheral wall of the main rotor chamber. The intake 60 is located adjacent the upstream end of the first zone 62, and is bridged thereby. The first zone 62 of the main rotor chamber 12 has a radius substantially equal to, but slightly exceeding, the outer radius of the lobes 26. There also may be lateral clearances between the lobes 26 and the end walls 34.

Downstream of the first main rotor chamber zone 62, in the direction of main rotor rotation, is a second, axially and/or radially enlarged, accumulator zone 68, shown as having a radius substantially greater than the outer radius of the main rotor lobes 26. This accumulator zone 68 extends from the point 64 on the peripheral wall of the main rotor chamber 12 to the combustion rotor chamber 16.

After several of the main rotor lobes 26 sweep the portion of the first zone 62 between the point 70 and the point 64, a predetermined degree of pre-compression is built up in the accumulator zone 68. Thus, the accumulator zone 68 acts as a source of pre-compressed fuel-air mixture for delivery to successive combustion cavities 48 in the combustion rotor 30, which is an important feature of the invention. The accumulator zone 68, by providing a pre-compressed supply of the fuel-air mixture, has several advantages. For example, tight seals between the main rotor 24 and the housing 10 are unnecessary so that tolerances can be relaxed, there being no reliance on any single main rotor lobe 26 to deliver the fuel-air mixture to one of the combustion cavities 48. Consequently, tolerances between the lobed main rotor 24 and the housing 10 can be relaxed for more economical and simpler manufacture. Also, since larger tolerances are possible because of the pressure of the accumulator zone 68, no lubricant between the lobed rotor 24 and the housing 10 is necessary, which reduces air pollution. Additionally, since larger tolerances are possible, the effects of heat distortion of the various parts are minimized.

Each main rotor lobe 26 carries a spark plug 72 which, as best shown in FIG. 3, provides a spark gap 74 on the trailing side 76 of the corresponding lobe. Each spark plug 72 is actuated when the main rotor lobe 26 carrying it is disposed in one of the combustion cavities 48, and when the trailing edge 78 of such combustion cavity has substantially reached tangency to the periphery of the main rotor 24 between the lobes 26. In FIG. 1 of the drawings, one of the lobes 26 is shown in one of the combustion cavities 48 after actuation of the corresponding spark plug 72. Actuation of the proper spark plug 72 can be achieved by engagement of a contact 80 on the spark plug with a contact 82 on the end wall 34.

With the foregoing locations of the spark gaps 74 on the trailing sides 76 of the main rotor lobes 26, the flame front, upon spark plug actuation, has a very short distance to travel to traverse the entire combustion cavity 48 and, by starting the flame front on the moving lobe, it does not have to catch a retreating lobe, thereby producing quicker and cleaner combustion, which are important features.

Another important feature of the invention is that there is a relatively large gap 86, as shown in FIGS. 1 and 3, between the trailing edge 78 of each combustion cavity 48 and the trailing side of that one of the main rotor lobes 26 which is disposed in that combustion cavity. Prior to the time that the trailing edge 78 of each combustion cavity 48 becomes substantially tangent with the periphery of the main rotor 24 between the lobes 26 thereon, the gap 86 is in communication with the accumulator zone 68. Thus, the pre-compressed fuel-air mixture in the accumulator zone 68 can flow freely into or out of the corresponding combustion cavity 48 through each gap 86, thereby eliminating any necessity for tight seals to maintain compression in the combustion cavity. The leading edge 88 of each combustion cavity 48 is close to the leading side of each main rotor lobe 26 to provide a very small gap, thereby maintaining maximum compression in the combustion cavity.

The main rotor chamber 12 includes, downstream from the combustion rotor chamber 16, a third, power zone 90 which extends substantially to the exhaust blocking rotor chamber 18 and which terminates in an exhaust 92 in the housing 10 adjacent the exhaust blocking rotor chamber, but upstream therefrom in the direction of main rotor rotation. The power zone 90 has a radius substantially equal to, but slightly exceeding, the outer radius of the main rotor lobes 26. There may also be a lateral clearance between the lobes 26 and the end walls 34. As will be apparent, as each main rotor lobe 26 traverses the power zone 90, the expanding products of combustion emanating from the combustion cavity 48 vacated by that main rotor lobe acts thereon to drive the main rotor 24.

A passage or passage means 94 in the housing 10 connects the combustion rotor chamber 16, in an area spaced radially outwardly from the main rotor chamber 12, to the third zone 90 of the main rotor chamber at a point downstream from the combustion rotor 30. It will be seen that, after the combustion rotor 30 has rotated beyond the position shown in FIG. 1, the uppermost combustion chamber 48 in FIG. 1 will communicate with the passage 94 to discharge any residual products of combustion under pressure through the passage 94 into the power zone 90 behind the main rotor lobe 26 which has just vacated the combustion cavity 48 in question. This results in a longer and stronger power surge, which is an important feature.

Ultimately, each combustion cavity 48 encounters a scavenging passage or passage means 96 in the housing 10, which is spaced from and does not communicate with the passage 94, or the zone 68. The passage 96 communicates at one end with the combustion rotor chamber 16, and at its other end with the exhaust 92. With this construction, any residual products of combustion in each combustion cavity 48 are aspirated into the exhaust 92 to achieve substantially complete scavenging.

The end walls 34 are provided with grooves 96, FIGS. 1 and 2, which cooperate with the ports 54a to discharge to the exhaust 92 any exhaust gases remaining in each exhaust blocking rotor cavity 50 as it is entered by one of the main rotor lobes 26. This insures substantially complete elimination of exhaust gases, which is an important feature.

As shown in FIGS. 1 and 3, the size of each combustion cavity 48 in the combustion rotor 30 may be varied to vary the compression ratio. FIGS. 1 and 3 show alternate, larger combustion cavities 98 and 100 in broken lines to provide progressively smaller compression ratios.

Figure 4:
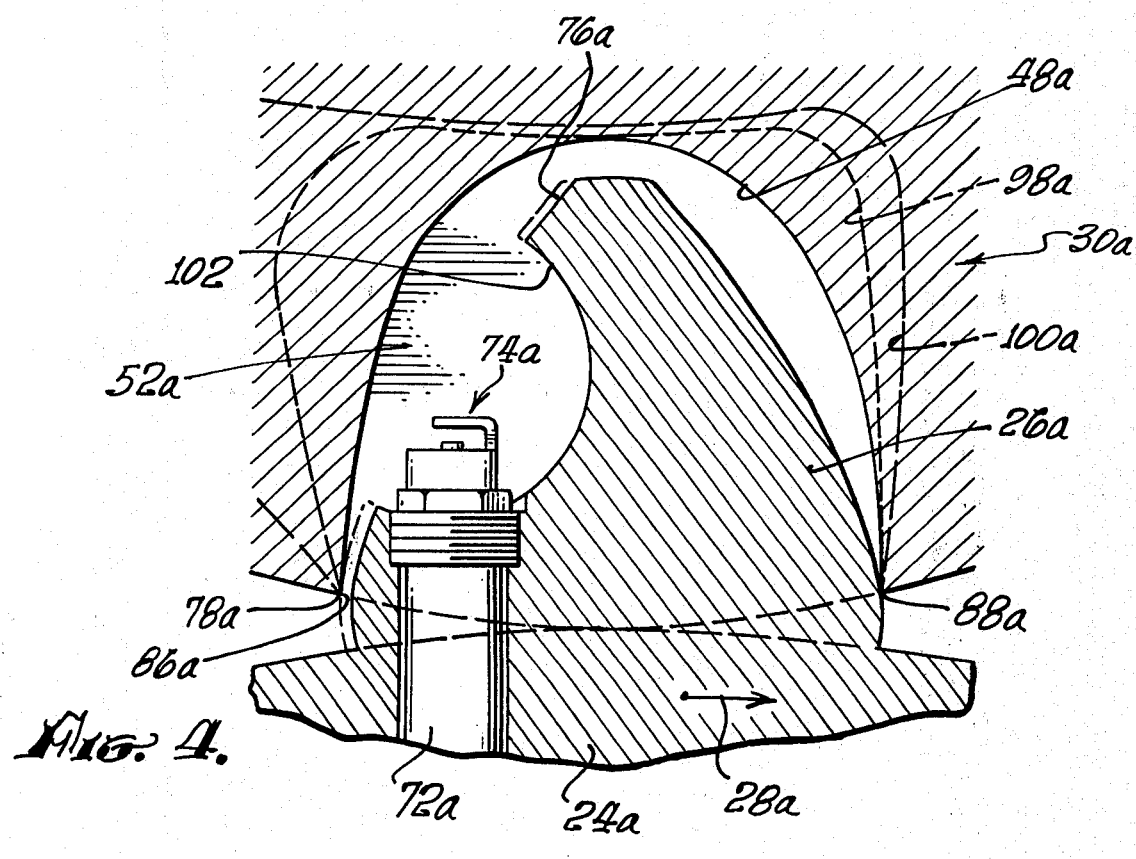

FIG. 4 of the drawings shows an alternate main rotor and combustion rotor construction which is similar to that shown in FIG. 3, and wherein corresponding parts are designated by the same reference numerals with the suffix *a* added. The construction of FIG. 4 differs primarily in that each spark plug 72a is generally radially oriented, with respect to the main rotor 24a, and its spark gap 74a is disposed in a recess 102 in the trailing side 76a of the corresponding lobe 26a. Another difference is that alternate positions are shown for the trailing side 76a of the lobe 26a, one being shown in solid lines, and the other in broken lines. By varying the location of the trailing side 76a throughout the range indicated by the solid and broken lines mentioned, the size of the gap 86a can be varied.

Although exemplary embodiments of the invention have been disclosed for illustrative purposes, it will be understood that various changes, modifications and substitutions may be incorporated in such embodiments without departing from the invention as hereinafter claimed.

I claim as my invention:
1. In a rotary engine of the internal combustion type, the combination of:
   a. a housing having therein a main rotor chamber providing a main rotor axis;
   b. a main rotor rotatable in said main rotor chamber about said main rotor axis in a predetermined direction of rotation;
   c. said main rotor being provided on its periphery with circumferentially spaced lobes;
   d. said housing having an intake communicating with said main rotor chamber;
   e. there being a small clearance between said main rotor chamber and said lobes in a first zone bridging said intake and extending downstream therefrom in said direction of main rotor rotation;
   f. there being a large clearance between said main rotor chamber and said lobes in a second zone extending downstream from said first zone in said direction of main rotor rotation;
   g. a combustion rotor located downstream of from said second zone in said direction of main rotor rotation and rotatable about a combustion rotor axis spaced from and parallel to said main rotor axis;
   h. said combustion rotor having a combustion cavity therein to receive said lobes;
   i. there being a small clearance between said main rotor chamber and said lobes in a third zone extending downstream from said combustion rotor in said direction of main rotor rotation;
   j. said housing having an exhaust communicating with said main rotor chamber in said third zone adjacent the downstream end of said third zone in said direction of main rotor rotation;
   k. an exhaust blocking located between said third and first zones and rotatable about an exhaust blocking rotor axis spaced from and parallel to said main rotor axis;
   l. said exhaust blocking rotor having a cavity to receive said lobes;
   m. timing gear means interconnecting said main rotor, said combustion rotor and said exhaust blocking rotor;
   n. the peripheries of said combustion rotor and said exhaust blocking rotor being substantially tangent to the periphery of said main rotor between said lobes;
   o. means for producing a spark in said combustion cavity in said combustion rotor when the trailing edge is such combustion cavity is substantially tangent to said main rotor; and
   p. the spacing of said lobes being such that when each lobe enters said second zone, the following lobe has traversed said intake.
2. In a rotary engine of the internal combustion type, the combination of:

a. a housing having therein a main rotor chamber providing a main rotor axis;

b. a main rotor rotatable in said main rotor chamber about said main rotor axis in a predetermined direction of rotation;

c. said main rotor being provided on its periphery with circumferentially spaced lobes;

d. said housing having an intake communicating with said main rotor chamber;

e. there being a small clearance between said main rotor chamber and said lobes in a first zone bridging said intake and extending downstream therefrom in said direction of main rotor rotation;

f. there being a large clearance between said main rotor chamber and said lobes in a second zone extending downstream from said first zone in said direction of main rotor rotation;

g. a combustion rotor located downstream from said second zone in said direction of main rotor rotation and rotatable about a combustion rotor axis spaced from and parallel to said main rotor axis;

h. said combustion rotor having circumferentially spaced combustion cavities therein to receive said lobes;

i. there being a small clearance between said main rotor chamber and said lobes in a third zone extending downstream from said combustion rotor in said direction of main rotor rotation;

j. said housing having an exhaust communicating with said main rotor chamber in said third zone adjacent the downstream end of said third zone in said direction of main rotor rotation;

k. an exhaust blocking rotor located between said third and first zones and rotatable about an exhaust blocking rotor axis spaced from and parallel to said main rotor axis;

l. said exhaust blocking rotor having circumferentially spaced cavities to receive said lobes;

m. timing gear means interconnecting said main rotor, said combustion rotor and said exhaust blocking rotor;

n. the peripheries of said combustion rotor and said exhaust blocking rotor being substantially tangent to the periphery of said main rotor between said lobes;

o. spark plugs carried by said main rotor and respectively having spark gaps on the trailing sides of said lobes in said direction of main rotor rotation;

p. means for actuating each of said spark plugs when said lobe carrying it is disposed in one of said combustion cavities in said combustion rotor and when the trailing edge of such combustion cavity is substantially tangent to said main rotor; and q. the spacing of said lobes being such that when each lobe enters said second zone, the following lobe has traversed said intake.

3. A rotary engine as defined in claim 2 wherein said combustion and exhaust blocking rotors are respectively disposed in complementary combustion rotor and exhaust blocking rotor chambers intersecting said main rotor chamber.

4. A rotary engine according to claim 3 including passage means in said housing for connecting each of said combustion cavities in said combustion rotor to said third zone after one of said lobes leaves such combustion cavity and after the trailing edge of such combustion cavity comes close to the peripheral wall of said combustion rotor chamber.

5. A rotary engine as set forth in claim 3 including circular end plates respectively carried by the ends of and having substantially the same diameters as said combustion and exhaust blocking rotors.

6. A rotary engine according to claim 3 wherein there is a gap between said trailing edge of each combustion cavity and that one of said lobes which is disposed therein.

* * * * *